United States Patent [19]

Croizer et al.

[11] Patent Number: 4,914,487
[45] Date of Patent: Apr. 3, 1990

[54] PHOTOELASTICITY DETERMINATION OF A DEFORMATION OR STRESS FIELD

[75] Inventors: Pierre Croizer, Elancourt; Philippe Dessendier, Palaiseau, both of France

[73] Assignee: Matra, Paris, France

[21] Appl. No.: 158,804

[22] Filed: Feb. 19, 1988

[30] Foreign Application Priority Data

Feb. 19, 1987 [FR] France ............... 87 02149

[51] Int. Cl.$^4$ ............................................. C01B 11/18
[52] U.S. Cl. ...................................... 356/35; 356/367
[58] Field of Search ................. 356/364, 366, 367, 33, 356/34, 35

[56] References Cited

U.S. PATENT DOCUMENTS 3,243,819  3/1966  Chapman ............................... 356/33
3,373,652  3/1968  Flader .................................... 356/33
4,684,487  8/1987  Gawrisch ............................. 356/364

Primary Examiner—Richard A. Rosenberger
Attorney, Agent, or Firm—Larson and Taylor

[57] ABSTRACT

A method for photoelasticity examination of a stress or strain field comprises successive steps. A two dimensional image of a test-piece is formed which has isochromatic fringes in the form of an array of pixels and the grey level of each pixel is stored as a digital value. From the isoclinals, the orientation of the main stresses $\sigma$I and $\sigma$II is determined at each pixel and the angle of orientation is stored for obtaining each pixel; from the stored pixels, the law of variation of brightness is worked out along at least three lines parallel to an arbitrary direction chosen by the operator and passing completely through the test-piece; from a condition at the limits and by finite differences then integration, a value is determined representative of $\sigma$I and $\sigma$II at each point of the median line among the three lines and $\sigma$I and $\sigma$II are derived from the stored digital values and from the computed values of $\sigma$I and $\sigma$II. A device for carrying out the method includes a polarizer and an analyzer whose relative angle may be modified, an imaging system and a computer for carrying out the successive computation steps.

5 Claims, 3 Drawing Sheets

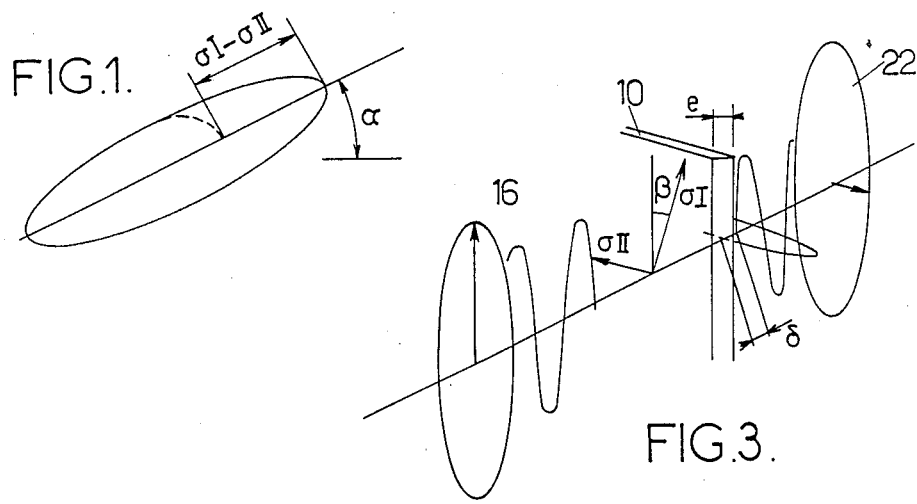
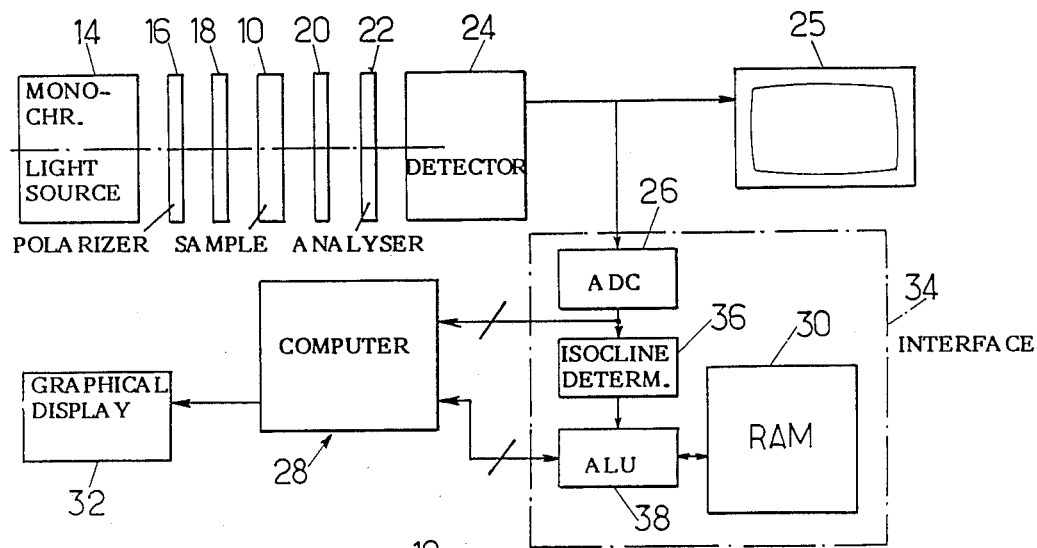
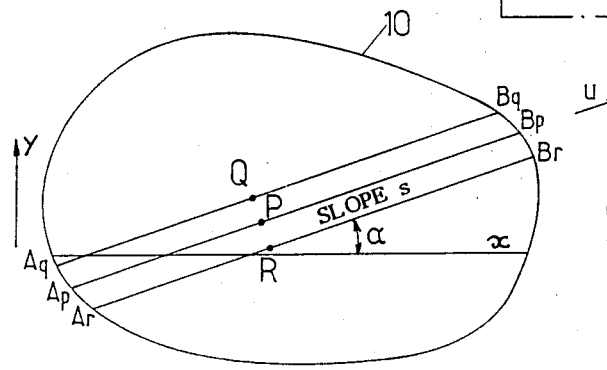

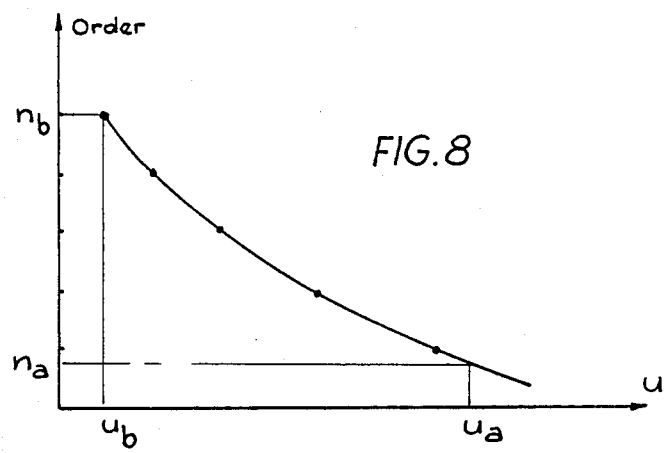

PHOTOELASTICITY DETERMINATION OF A DEFORMATION OR STRESS FIELD

BACKGROUND OF THE INVENTION

1. Technical Field

The invention relates to a method and device for determining by photoelasticity the distribution of a deformation or stress field in a work piece subjected to loads.

2. Prior Art

Photoelasticimetry is a method based on birefringence, due to the anisotropy created by deformations in work pieces or coatings made from a normally monorefringent transparent material. For carrying out the method, two-dimensional images are formed of a test piece or model representing a work piece, subjected to the loads whose effect is to be studied. Images are formed under conditions such that there are interference fringes between ordinary and extraordinary rays, which fringes represent the distribution of the shearing stresses.

The measurements using photoelasticity make available images containing the full information required for determining the internal deformations or stresses of a work piece. However, the method is generally used for obtaining qualitative information only, particularly for determining the maximum shearing stress lines. For this application, the photoelasticimetry processes provide very rapidly an overall display of the shearing field from which zones of maximum shearing may be obtained, with low investment and implementation costs.

A reason why the measurement of photoelasticimetry is little used for determining the distribution of stresses along selected lines through the test piece is that it does not give access directly to the quantitative information which is of interest for the engineer, i.e. the the values of the principal stresses and the orientation thereof.

The image of the test piece studied obtained by directing a light beam successively through a polarizer, the test-piece and an analyser (generally parallel to the polarizer or crossed therewith) has:

constant color bands, called isochromatic fringes or lines, which correspond to the locii having the same difference $\delta$ of the light paths of the two types or rays, and black lines, called isoclinic fringes or isoclinals, which are locii of the points where the main stresses in the test piece have a predetermined direction depending on the mutual angular position of the polarizer and analyzer.

Images showing ones or others of the two line arrays may be obtained by using the fact that the isochromatic lines are independent of the polarization direction whereas a modification of this direction changes the isoclinals. Conventionally, the isoclinals are eliminated by illuminating the test piece with circularly polarized light and the isochromatic lines are independent of the polarization direction whereas a modification of this direction changes the isoclinals. Conventionally, the isoclinals are eliminated by illuminating the test piece with circularly polarized light and the isochromatics are spread out by illuminating the test piece with white light to enhance the isoclinals, which are independent of the wave length.

At any given point of the test-piece, the ellipsoid of the deformations (and of the stresses in the case of a test-piece made of isotropic material, which alone will be considered hereafter) and the ellipsoid of the optical indices have the same principal axes. In the cross-section of the two ellipsoids by a wave plane containing a principal plane, the directions of the principal stresses $\sigma\mathrm{I}$ and $\sigma\mathrm{II}$ coincide with those of the principal optical indices N1 and N2. As long as the index variation remains small, there exists a relationship of the form:

$$\delta = C\, e(\sigma\mathrm{I} - \sigma\mathrm{II}) \quad (1)$$

where $\delta$ is the phase difference, e is the thickness of material passed through and C is a constant value called photoelasticity constant.

Examination of the isochromatic lines makes it possible to determine $\sigma\mathrm{I} - \sigma\mathrm{II}$ at each point and that of the isoclinals for several polarization directions makes it possible to determine the angle $\alpha$ of the direction of one of the principal stresses with a reference direction (FIG. 1) or the angle $\beta$ with the polarization direction.

But the engineer is generally interested in measuring $\sigma\mathrm{I}$, $\sigma\mathrm{II}$ and $\alpha$ at a number of points.

A first approach for obtaining the values of $\sigma\mathrm{I}$ and $\sigma\mathrm{II}$ at each point consists in making other measurements on the test-piece, using a method giving an indication about $\sigma\mathrm{I} + \sigma\mathrm{II}$ at each point, such as thermoelasticity. But this solution complicates and extends the duration of the measurements and requires expensive apparatus.

The invention starts from an entirely different approach. It uses the fact that, if part at least of the test-piece is available and the conditions at the limits are known, it becomes possible to integrate the well-known equilibrium equation:

$$(\delta\sigma_x/\delta x) + (\delta\tau_y/\delta y) = 0 \quad (2)$$

Thus the relationships required for obtaining the main stresses are available.

But computation is very heavy and difficult to carry out manually. In practice, the measurement of photoelasticity is consequently used at the present time as a tool for searching for the points of maximum shearing.

SUMMARY OF THE INVENTION

It is an object of the invention to provide a method for determining, from a plurality of images of photoelasticity of the same test-piece obtained with different polarization directions, the complete distribution of the deformation (strain) or stress field.

For that purpose, there is provided a method including:

forming a two-dimensional photoelasticity image of the isochromatic fringes of a stressed piece as a network of pixels and storing the brightness level or grey level of each pixel in digital form, determining the angular directions of the main stresses $\sigma\mathrm{I}$ and $\sigma\mathrm{II}$ from the isoclinals for each pixel and storing the angular directions for each pixel, from the stored pixels, deriving brightness variation along at least three lines which pass completely through the test-piece and are parallel to a same arbitrary operator-selected direction;

from conditions at the limits and by finite differences and integration, determining a value representative of $\sigma\mathrm{I} + \sigma\mathrm{II}$ at each point of the median line among said three lines and deriving $\sigma\mathrm{I}$ and $\sigma\mathrm{II}$ from the stored digital values and from the computed values of $\sigma\mathrm{I} + \sigma\mathrm{II}$.

The invention also provides a device for implementing the method, either by transmission, or by reflection.

The invention will be better understood from the following description of particular embodiments, given by way of examples. The description refers to the accompanying drawings.

BRIEF DESCRIPTION OF THE DRAWINGS

FIG. 1, already mentioned, shows the principal stresses at one point of a test-piece;

FIG. 2 is a diagram showing an embodiment of a photoelasticimetry device implementing the invention;

FIG. 3 is a diagram showing the parameters which are involved when implementing the invention using optical transmission;

FIG. 4 is a diagram showing the elements which are involved in the calculation of the stresses along a line [Ap, Bp];

FIG. 8 is a curve obtained by interpolation and providing the values of the fringe orders along a segment.

DESCRIPTION OF PREFERRED EMBODIMENTS

Figure 5:
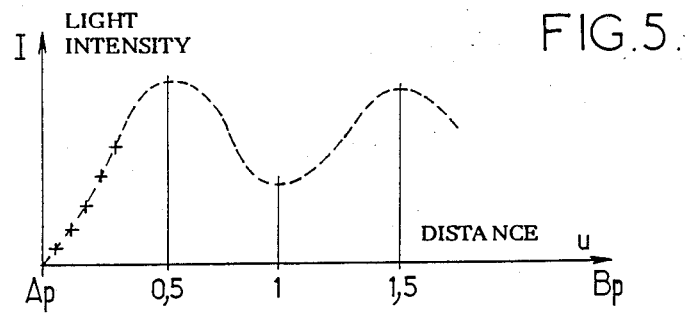
FIGS. 5 and 6 are curves showing a possible distribution of the light intensity along line [Ap, Bp] of FIG. 4 and of the difference between the principal stresses along this line.

Referring to FIG. 2, a photoelasticimetry device uses light transmission across a test-piece 10 of a transparent material which exhibits birefringence and is subjected to loads representative of those which are applied to a real work piece under actual conditions of use. The device comprises a monochromatic light source 14 illuminating the test-piece 10 through a polarizer 16 and a quarter-wave plate 18 so as to obtain a light beam with circular polarization for eliminating the isoclinals from the image. The beam leaving the test-piece 10 passes through a quarter wave plate 20 which reestablishes rectilinear polarization and an analyser 22 and is received by a detector 24 connected to a display device 25 such as a video monitor.

The construction which has just been described is well known. When the analyser 22 is parallel to the polarizer 16, isochromatics are obtained which are the locii of the points for which the difference $\sigma I - \sigma II$ between the principal stresses (FIG. 1) is proportional to a whole multiple of the wave length $\lambda$ (the coefficient of proportionality being constant). When it is perpendicular thereto, locii are obtained of the points for which $\sigma I - \sigma II$ is proportional to $(2k+1) \lambda/2$, k being an integer.

As a general rule, the light intensity I at a given point, for which one of the main directions is at an angle with the polarization direction is, if the analyser is crossed with the polarizer:

$$I = \sin^2(2\beta) \cdot \sin^2(n\delta/\lambda) \qquad (3)$$

where $\lambda$ designates the wave length and $\delta$ the difference between the paths of the ordinary and extraordinary rays.

According to an aspect of the invention, the device includes means for delivering a digital representation of the images obtained, for storing the representation and carrying out iterative calculations thereon to provide the principal stresses $\sigma I$ and $\sigma II$ (or the strains) at any desired point.

For that purpose, a matricial detector 24 is used, typically a CCD camera, with a sensor network giving a representation of the image in the form of an array of pixels aligned in two mutually orthogonal directions X and Y. The output of the matrix detector 24 is digitalized by an A-D converter 26 and applied to a computer 28. The latter includes a storage and image processing electronic board 30 for representing each image as a set of, for instance, $512 \times 512$ pixels with quantification of each pixel on a scale having $2^8 = 256$ grey levels.

Before the device according to a particular embodiment of the invention, illustrated in FIG. 2, is further described, it may be useful to summarize the method which it carries out.

During a first step the angle $\alpha$ between the direction of one of the principal stresses and a reference direction, which may be direction x, is determined at each point. For that, the isoclinals for several angles between the polarizer 16 and the analyser 22 are caused to appear by removing the quarter-wave plates or placing them parallel to each other. For each angle, the pixels belonging to the isoclinals are identified based on the fact that they have a very low light intensity, which makes it possible to detect them by comparing the light intensity of each pixel with a predetermined threshold in the grey scale.

Thus, for each of N successive angles $\alpha$, the pixels belonging to the respective isoclinals are detected and, for each value of $\alpha$, the points of the isoclinals having the particular direction $\alpha$ are stored with the respective value of $\alpha$.

When the images for N directions have been analyzed, a single representation of the image is available giving, for each pixel, the angle $\alpha$ which constitutes the useful information.

The precision in determining angle $\alpha$ for each pixel increases if the number N of measurement orientations is increased. Generally, measurements for twenty different angular values give a satisfactory result. However, the number is often smaller, six for example. If necessary, an interpolation may be carried out if the light intensities of a pixel are less than the threshold for two mutually adjacent orientations.

After the first step, a map of the directions of the principal stresses at each pixel is available.

During a second step the intensity I as defined by formula (3) is determined for each point of the test-piece. Formula (3) shows that the light intensity is zero along the isoclinals (i.e. for $\beta = 0$). Zero values may be avoided by using circularly polarized light so that the light intensity at each point is a function of $n\delta/\lambda$ only.

During the second step, a value of I which is a representation of $\sigma I - \sigma II$ is determined for each pixel and is stored; then, it will be possible to compute $\sigma I - \sigma II$ therefrom using formulae (3) and (1), by taking into account the fact that, with monochromatic light, the points for which $$\sigma I - \sigma II = m\lambda/Ce \qquad (4)$$

where m is an integer, appear as black lines.

Examination under white light makes it possible, if required, to determine which is the zero order fringe; such determination may be made visually by an operator who will then manually indicate an origin for the calculation of $\sigma I$ and $\sigma II$.

Step 3:

After the operator has obtained a map giving the values of the angle $\alpha$ and the light intensity I (representative of $\sigma I - \sigma II$), for all the pixels, he selects a straight line segment (i.e. a line throughout the test-piece) along which he desires to determine the principal stresses. Referring to FIG. 4, the line will be designated [Ap, Bp] and the current point on the line will be designated P. The distribution of the light intensities I along the segment has a generally sine wave shape, as indicated in FIG. 5 (where the figures along the axis of the abscissa indicate the orders of the successive fringes) if angle $\alpha$ is zero for the selected segment, i.e. if the segment is along a row of pixels, the distribution of the light intensities along the segment are directly available. If not, conventional methods of interpolation or dedication of pixels make it possible to generate a curve of the kind shown in FIG. 5, as will be shown later.

Figure 6:
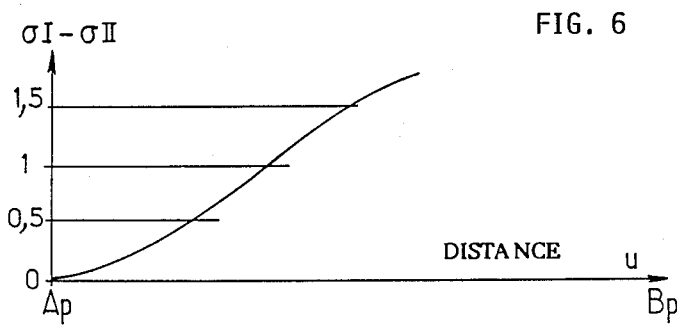

From the curve of FIG. 5 and in an interactive way, the points which correspond to a local minimum, i.e. to a fringe whose order is an integer (0, 1, ..., etc) or to a local maximum, i.e. to an uneven number of half-fringes may be determined. By applying formulae (1) and (3), the variation of $\sigma I - \sigma II$ along the segment may be derived as samples each assigned to a pixel and distributed over a curve of the kind shown in FIG. 6.

The minima and the maxima may be "clicked" directly by the operator, for example using a mouse interactive with the display monitor 25. They may also be determined automatically by the computer 30, using one of the conventional programs dealing with noise, such as search for the middle of the intersection between a line of constant intensity and two portions of the curve of FIG. 5 straddling a maximum or a minimum, or search for the inflection points on an integral curve.

The same operations are repeated for two lines [Aq, Bq] and [Ar, Br] parallel to [Ap, Bp], of the same distance thereof and straddling it, as indicated in FIG. 4.

Then the value of $\tau xy$ at each point P may be computed:

$$\tau xy = \tfrac{1}{2}(\sigma I - \sigma II). \sin 2\alpha \qquad (5)$$

using the relation between the normal and shearing stresses. Then, starting from the values of $\tau$ along segments [A$_q$, B$_q$], an approximate value of $\delta\tau xy/\delta y$ may be calculated for each point P of the segment [Ap, Bp] using the finite difference approximation:

$$\delta\tau xy(P)/\delta y = [\tau xy(Q) - \tau xy(R)]/2\epsilon ps \qquad (6)$$

where $\epsilon ps$ designates the spacing between successive lines of pixels.

When the value derived from equation (6) is available for all points P, $\delta\sigma x/\delta x$ may be computed for each point using equation (2) which can be written:

$$\delta\tau xy/\delta y = -\delta\sigma x/\delta x \qquad (7)$$

Since the initial values are known at Ap and/or at BP, it is possible to calculate the integral:

$$\sigma x(p) = \int_{A_p}^{P} (\partial \sigma x/\partial x) dx \qquad (8)$$

and to derive $\sigma I + \sigma II$ at each point of the segment [Ap, Bp] using the relationship:

$$\sigma x = [(\sigma I + \sigma II)^2] + [(\sigma I - \sigma II)/2] \cos 2\alpha) \qquad (9)$$

Finally, from $\sigma I - \sigma II$ and $\sigma I + \sigma II$, it is possible to determine $\sigma I$ and $\sigma II$ for all the points P. For example:

$$\sigma I = \tfrac{1}{2}(\sigma I + \sigma II) + \tfrac{1}{2}(\sigma I - \sigma II).$$

To sum up, the method of the invention requires: determining the isoclinals and assigning an angle $\alpha$ of one of the principal stresses to each pixel; determining the isochromatic and storing the light intensities transmitted for at least one image; and finally a computation step implying selecting and generating a segment, determinating the variation of fringe orders along the segment, computing angle $\beta$ from angle $\alpha$ stored for each point of the segment and separating the stresses $\sigma I$ and $\sigma II$.

The functions which have just been described may be fulfilled with an A/D converter and a programmed general purpose computer. However, it will often be more advantageous to add a dedicated image processing card to a computer.

The device shown schematically in FIG. 2 may for example be implemented using a computer 28 operating under Unix and having a central memory of one megabyte and a mass memory of fifty megabytes, with a graphic color display unit 32, interfaced with the optical system by a card 34. Card 34 then comprises the A/D converter 26, a circuit 36 for determining the isoclinals by comparison with a threshold and an ALU 30. The RAM 30 may have a capacity of 512×512 pixels corresponding to four complete images. The program loaded in computer 28 for sequencing the operation is directly derived from the above-defined steps and it is therefore not necessary to describe it in full detail, although the general logic organization of a typical program is explained hereinafter.

Because the image processing method which has been described makes it possible to obtain a high degree of accuracy, it is possible to use images having a small number of fringes, the whole of the work piece representing for example an extent not exceeding 0.2 fringe. It is consequently possible either to study test pieces under very low stress, or to have a very small thickness e, so that coating 12 may be sufficiently thin to be gun sprayed. Conversely, it is possible to study very distorted work pieces leading to a very high number of fringes, much greater than the seven fringes which are the practical limit that the human eye can evaluate.

Figure 7:
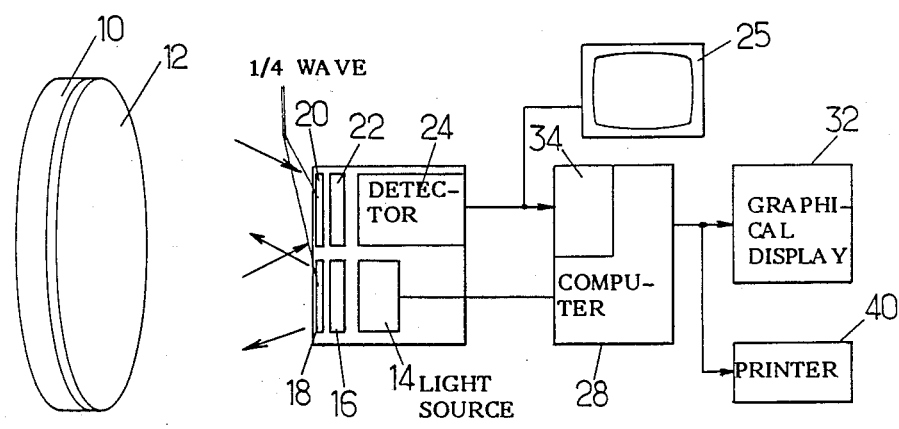
FIG. 7 is a schematic representation of a possible construction of the optical part of a modification of the device of FIG. 2.

The embodiment shown in FIG. 7, where the elements corresponding to those already described are designated by the same reference numbers, differs from that of FIG. 2 in that it is adapted for working by reflection. Then the work piece 10 forming the testpiece has a reflecting surface coated with a layer 12 of transparent material having birefringence properties under stress.

The optical part of the device of FIG. 7 comprises the same elements as that of FIG. 2. Since polarizer 16 and analyser 12 are placed side by side, they may be driven by the same rotation mechanism, possibly controlled by computer 28 for determination of the isoclinals and of angles $\alpha$ for all pixels without manual intervention. Another solution consists in disposing several receiving assemblies as a turret about the axis of the lighting unit, so as to have all images available simultaneously and to shorten the measuring time. The latter solution is of advantage for dynamic photoelasticimetry when it is desired to study the progressive deformation of a work piece under impact; then images at a rate which may reach several tens of thousands of images per second may have to be processed.

The device may be completed with additional permanent display or storage members for example with a graphic printer 40.

It should finally be noted that an optical device for recording images of the kind shown in FIG. 7 makes it possible to fulfil additional functions, for example automatic tracking of the fringes by detection of high gradient points, skeletonizing, etc. The light sources may be provided for operating either with fixed light intensity or servo controlled light intensity; they may be monochromatic or in white light (and then possibly followed by a monochromatic filter).

A short description will now be given of the logic organization of a computer program for carrying out the above-identified various computations necessary for obtaining a representation of the distribution of the deformation and/or stress field in a test-piece.

As already indicated, the method includes a plurality of operations:

1. Generating a segment across the test-piece: for that purpose the user should define the two ends of the segment along which he wishes to work.
2. Determining a curve representing the variation of the fringe serial number (i.e. the difference between the principal stresses) for the succesive points of the segment generated during step (1).
3. Computing the angle between one of the main directions for each point of the segment and a reference axis.
4. Starting from the computed values of said difference and said angle, separately computing the principal stresses or deformation.

The above steps will be considered in succession, although some of them can be carried out in a different order.

1. Generation of a segment and interpolation

That step is most easily carried out by an operator using a data processor or computer having a CRT display and a "mouse". With the mouse, the operator designates two points A and B which define the two ends of the segment to be processed. That segment will have to be approximated at best with a sequence of pixels since computation is carried out on pixels in a discrete rather than continuous space. A program is used which computes the complete set of pixels which best approximates the theoretical segment [A,B]. It carries out an interpolation and operates as follows: if x and y designate the coordinates along two orthogonal axes along which the pixels are aligned, the theoretical slope s of the segment may be written as:

$$s=(yB-yA)/(xB-xA)$$

where the y and x values are those actually designated.

The error with respect to the theoretical straightline de due to the fact there is a discrete representation may then be computed:

$$de=(xA*yB-xB*yA)/(xa-xb)$$

For each point M(x,y) of the segment, starting from A, a value er is computed:

$$er=y/s-der/(s-x)$$

The computed value of e is compared with 0.5. If higher than 0.5, the point M(x,y) is discarded since it is too far away from the theoretical straight line and then a point M' of coordinates (x+1,y) is stored.

The same operation is repeated until the ordinate of the current point exceeds that of point B.

2. Computation of the difference ($\sigma 1 - \sigma 2$) between the principal stresses for all points of the segment The fringe numbers at each point of the image, including a whole part and a fractional part (and consequently the difference between the main stresses) will be computed starting from the location of the isochromatic lines. For that purpose, it is necessary to remove the isoclinals which would obscure the fringe network of interest. For that purpose, two approaches are possible.

A first approach is conventional. It consists in using circularly polarized light. Then the isochromatic fringes only are visible. However, that approach has shortcomings. There is no quarter-wave plate satisfactory for the complete visible spectrum; the optical arrangement is more complex and there are additional handling steps; the cost of quarter-wave plates is rather high.

As a consequence, it may be preferable to use another approach, which consists of summing two images obtained under different conditions, namely with a mutual angle of the polarizers of 45°. Then the isoclinals are again removed.

A program may be used to store two images obtained with a 45° angle difference and to sum the images for obtaining a map of the isochromatic fringe array, which is the same as that which would be obtained with circularly polarized light. The isochromatic fringe array may be displayed on a monitor screen. As already described with reference to FIG. 5, the curves illustrating the variation of the light intensity as a function of the distance u along a segment has a generally sine wave shape. The operator can easily identify the minima and maxima and indicate them to the computer by "clicking" the mouse when the index is located in close proximity of a minimum or a maximum (which will both be referred to as being key points). A conventional interpolation program may then determine the actual position of the point of minimum (or maximum) brightness and that point is stored. The operator repeats identification until all key points have been defined and stored.

Then the fringe orders 0, 1, 2, . . . and 0.5, 1.5, 2.5 should be attributed to the stored key points. That determination may be made in an interactive or automatic way, without difficulty since order 0 is immediately apparent in white light. Finally, the computer stores a set of couples ($u_i$, $n_i$) where $u_i$ is the abscissa of the ith key point on the segment and $n_i$ is its fringe order. Starting from that set, the program generates, by linear or non linear interpolation, a curve n=f(u) corresponding to the whole segment, which may have the general shape shown in FIG. 8. As a result, the fringe serial order, i.e. the difference between the principal stresses, is known at any point of the segment.

3. Computation of the angle between one principal direction and a reference for each point of the segment through use of the isoclinals A photoelasticity image obtained with a linearly polarized light consists of two arrays of curves, the isochromatic lines and the isoclinals which have points where the light intensity is zero and which define the locii of the points where the principal directions are parallel to the polarization direction, i.e. for which $\beta = 0$. For determining, at each point of segment, the angular position of the principal directions, the rotation angle of the polarizers for which an isoclinal passes through the point should be measured. After the points M for which the angular position of the principal directions have a certain value been determined, the operation should be repeated for finding points M' for which there are isoclinals, corresponding to another direction, which pass through M', using another image. The program consequently uses information derived from a plurality of images and generates a composite map summing results obtained from several images.

Various methods are possible. A first one providing points which are on a selected segment will be described. It is based on the fact that, with linearly polarized light, it is possible to find an angular position of the polarizer and analyser such that there is an isoclinal passing through any selected point M. The method makes use of a step motor. Initially, the polarizer and analyser are located at an angle of 0° with respect to a reference direction, for instance the x axis (direction of the rows of pixels). Then the values of the intensities of all pixels along the segment are stored as couples of values $(\alpha, I_\alpha)$ where $\alpha$ is the angle of the polarizer and analyser and $I_\alpha$ is the light intensity at the point. The step motor rotates the analyser and polarizer by a predetermined angular amount, for instance 1°. A new couple of values $(\alpha+1, I_{\alpha+1})$ is stored for each pixel and the operation is repeated until $\alpha + 90°$.

Finally ninety couples of values are available for each pixel. Then, the program determines the angle $\alpha$ for which I is minimum for each pixel: that value corresponds to the angular position for which there is a isoclinal passing through the considered point. That value $\alpha_i$ which corresponds to the minimum value of $I_\alpha$ is stored for each pixel and all other values may be erased. A similar method may be used if it is preferred to operate over the whole image, rather than along successive lines. It will not be used unless it is important to get information over the whole of the test-piece.

4. Computation of the magnitudes of the individual stresses $\sigma I$ and $\sigma II$ At each point of the image, the value $(\sigma I - \sigma II)$ of the difference between the principal stresses and the value of angle between one of the principal stress direction and a reference direction along a segment of interest at least are available.

Computation of $\sigma I$ and $\sigma II$ takes place as successive operations along an optionally selected segment.

(a) As already indicated above, the operator indicates the segment along which the magnitudes of the principal stresses are to be computed. For that purpose, it designates the end points Ap and Bp on the video screen. Then, the program selects the pixels which approximate the points of the segment [Ap, Bp] at best. The respective pixels are stored in the form of the coordinates in two tables which will be designated aap(i) and bbp(i).

Starting from the two existing tables, the program generates two other tables:
   aaq(i) which includes the pixels which best approximate segment [Aq, Bq],
   bbr(i) which includes the pixels which best approximate segment [Ar, Br] as shown in FIG. 4.

(b) Then the computer computes values representing the variation of the difference $\sigma I - \sigma II$ between the principal stresses along segment [Ap, Bp] by applying formulae (1) and (3). A table dsig p(i) is finally available which provides the values of $(\sigma I - \sigma II)$ for all stored pixels along the segment. The values are similarly computed for [Aq, Bq] and [Ar, Br] and finally two other tables dsig q(i) and dsig r(i) are available.

(c) The angular positions of one of the two principal stresses are identified at each pixel, as indicated above. The determination results in three additional tables beta p(i), beta q(i) and beta r(i) which provide the angle of one of the principal stresses along each one of the three segments used for the final computation.

(d) For each pixel along the segments [Aq, Bq] and [Ar, Br], the program computes $\tau xy$ from the available values of the angle and the difference between the stresses, by applying formula (5).

(e) For each pixel of a segment [Ap, Bp], the formula (6) is used for approximating $\delta \tau xy / \delta y$ starting from the values of $\tau xy$ on the two segments which straddle [Ap, Bp].

(f) Starting from the equilibrium equation binding the normal shearing stresses (2), the value of $\delta \sigma x / \delta x$ is derived from the values obtained at (e).

(g) The program generates, for all pixels of the segment [Ap, Bp], the value $\sigma x(p)$ by integrating the derivative just found. For that purpose, the operator introduces manually the initial value of $\sigma$ and x (Ap) at the limit. An integration as indicated by formula (8) may be carried out using integration programs made available by most computer manufacturers.

(h) Starting from the values of Yx just determined and from the stored values of $\sigma I - \sigma II$ and $\alpha$, the computer may determine $\sigma I + \sigma II$ by applying the formula (9). It will be appreciated that such operation only requires operations which are available on any computer.

(i) Last, starting from $(\sigma I + \sigma II)$ and $(\sigma I - \sigma II)$ which are available at each pixel of the segment, determination of $\sigma I$ and $\sigma II$ individually may be made by arithmetic operations.

We claim:
1. Method for photoelasticity determination of the distribution of principal stresses along a straight line segment across a loaded test-piece of a material exhibiting induced birefringence, comprising the steps of:
   (a) directing polarized monochromatic light on the test-piece, forming a two-dimensional image of said test-piece as a two-dimensional array of pixels under conditions causing isochromatic fringes to appear while eliminating isoclinals and storing a brightness value for each of said pixels in digital form;
   (b1) directing light having a first angular direction of linear polarization onto said test-piece, forming a two-dimensional image of said test-piece as a two-dimensional array of pixels under conditions which provide isoclinals and storing data including only those pixels which are located on said isoclinals with said first angular direction of polarization at least in a part of interest of said image including said straight line segment and two lateral straight line segments located on either side of the first-named straight line segment, at the same distance thereof and parallel thereto;

(b2) repeating step (b1) with a plurality N−1 of other and mutually different angular directions of linear polarization, N being an integer greater than 1, whereby a table is obtained storing a respective angular direction of polarization for each of said pixels in the part of interest;

(c) deriving the value of the difference between the respective principal stresses at each pixel along said straight line segment from said stored brightness values, (d) computing a partial derivative of the variation of the stresses along a predetermined direction at each point of said first-named straight line segment from the stored values of the difference between the principal stresses at locations of the pixels of said lateral straight line segments, using finite difference approximations;

(e) computing the sum of the principal stresses at each pixel along said first-named straight line segment by integration of said derivative and using the stored values of the difference between the principal stresses along said first-named straight line segment;

(f) and computing the principal stresses from said sums and differences.

2. Method according to claim 1, wherein said isoclinals are found by comparing the light intensity transmitted through a polarizer, the test-piece and an analyser to a predetermined light intensity threshold for a plurality of angular positions of said polarizer and analyser.

3. Method according to claim 1, wherein computation of the values of $\sigma I + \sigma II$ on the first-named straight line segment includes indicating a zero order fringe on said first-named straight line segment, deriving $\sigma I - \sigma II$ from the brightness variation from the zero order fringe, repeating the same steps for the lateral straight line segments, computing the value of $\tau xy$ for each pixel of the first-named straight line segment, approximating the successive values of $\delta\tau/\delta y$ by finite difference between said lateral straight line segments, determining the partial derivative of $\sigma x$ from the partial derivative of $\tau$ and computing $\sigma$ by integration.

4. Method according to claim 1, wherein, during step (a), the two-dimensional array of pixels is formed by:
obtaining a first picture by passing said linearly polarized monochromatic light which is linearly polarized through a polarizer having a predetermined direction of polarization, storing values of the pixels of said first picture, obtaining a second picture by passing said linearly polarized monochromatic light through a polarizer having a direction of polarization at 45° from the direction of polarization for forming the first picture, storing values of the pixels of the second picture, and summing the two values for each pair of corresponding pixels in the two pictures for forming said two-dimensional image.

5. Apparatus for photoelasticity determination of the distribution of principal stresses along a straight line segment across a loaded test-piece of a material exhibiting induced birefringence, comprising:

polarizer means directing polarized monochromatic light on the test-piece and analyser means for receiving said light from said test piece and forming a two-dimensional image of said test-piece as a two-dimensional array of pixels, means operatively associated with said polarizer and analyser to cause isochromatic fringes to appear in said image while eliminating isoclinals and storing a brightness value for each of said pixels in digital form;

means for optional modification of the polarizer and analyser to form sucessive two-dimensional images of said test-piece as two-dimensional arrays of pixels under conditions which provide successive sets of isoclinals and storing data including only those pixels which are located on said isoclinals for each said angular direction of polarization, and computer means for successively computing the values of the difference between the respective principal stresses at each pixel along said straight line segment from said stored brightness values; computing a partial derivative of the variation of the stresses along a predetermined direction at each point of said straight line segment from the stored values of the difference between the principal stresses at locations of the pixels of lateral straight line segments located on either side of the first-named straight line segment, at the same distance thereof and parallel thereto, using finite difference approximations; computing the sum of the principal stresses at each pixel along said first-named straight line segment by integration of said derivative and using the stored values of the difference between the principal stresses along said first-named straight line segment; and computing the principal stresses from said sums and differences.

* * * * *